US008813487B1

(12) United States Patent
Mears et al.

(10) Patent No.: US 8,813,487 B1
(45) **Date of Patent: *Aug. 26, 2014**

(54) HYDRAULIC WHEEL DRIVE SYSTEM WITH SELECTIVELY ACTUATED MOTOR

(75) Inventors: Keith M. Mears, Delphi, IN (US); James E. Smith, West Lafayette, IN (US); Brad A. Meyerholtz, West Lafayette, IN (US)

(73) Assignee: Terra Drive Systems, Inc., Brookston, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/573,263

(22) Filed: Sep. 6, 2012

Related U.S. Application Data

(63) Continuation of application No. 12/387,685, filed on May 6, 2009, now Pat. No. 8,276,376.

(51) Int. Cl.
*B60K 17/34* (2006.01)
*B60K 17/356* (2006.01)

(52) U.S. Cl.
USPC .............................................. 60/464; 60/484

(58) Field of Classification Search
USPC .................................. 60/435, 442, 464, 484
See application file for complete search history.

(56) References Cited

U.S. PATENT DOCUMENTS

| | | | | |
|---|---|---|---|---|
| 3,090,361 | A | 5/1963 | Orshansky, Jr. | |
| 3,439,766 | A | 4/1969 | Dence at al. | |
| 3,811,525 | A | 5/1974 | Stuart | |
| 3,824,899 | A | 7/1974 | Dzioba | |
| 3,940,159 | A | 2/1976 | Pringle | |
| 3,978,771 | A | 9/1976 | Burnight et al. | |
| 3,999,465 | A | 12/1976 | Burnight | |
| 4,021,690 | A | 5/1977 | Burton | |
| 4,140,196 | A | 2/1979 | Brewer | |
| 4,171,732 | A | 10/1979 | Pinson | |
| 4,244,184 | A | 1/1981 | Baldauf et al. | |
| 4,326,450 | A | 4/1982 | Bacquie | |
| 4,766,727 | A | 8/1988 | Dull et al. | |
| 4,913,258 | A | 4/1990 | Sakurai et al. | |
| 5,224,411 | A | 7/1993 | Fillion | |
| 6,367,572 | B1 | 4/2002 | Maletschek et al. | |
| 6,494,127 | B1 | 12/2002 | Cunningham | |
| 8,276,376 | B2 * | 10/2012 | Mears et al. | 60/464 |

* cited by examiner

*Primary Examiner* — Thomas E Lazo
(74) *Attorney, Agent, or Firm* — George Pappas

(57) ABSTRACT

A hydraulic circuit for a vehicle includes a first loop that includes, in serial order, a first hydraulic pump, a first hydraulic line, a hydraulic motor and a second hydraulic line. A second hydraulic pump and a third valve control low pressure fluid from the second pump to the hydraulic motor casing. The low pressure fluid through the third valve maintains the motor pistons retracted when the motor is not being used. For actuating the motor, the third valve is actuated for disconnecting the second pump and relieving pressure from the motor casing. Low pressure is then provided to the first and second lines for extending the motor pistons. The first and second valves are then actuated for isolating the first and second lines from one another, and the first pump is used to power the motor. The first, second and third valves are advantageously solenoid cartridge valves.

20 Claims, 6 Drawing Sheets

HYDRAULIC WHEEL DRIVE SYSTEM WITH SELECTIVELY ACTUATED MOTOR

CROSS REFERENCE TO RELATED APPLICATIONS

This is a continuation of and claims priority of application Ser. No. 12/387,685 filed May 6, 2009 now U.S. Pat. No. 8,276,376 the disclosure of which is hereby incorporated herein by reference.

BACKGROUND OF THE INVENTION

1. Field of the Invention

The present invention relates to vehicles having a primary transmission and a hydraulic motor that provides a drive assist and, more particularly, a hydraulic circuit including such a hydraulic assist motor.

2. Description of the Related Art

Many large vehicles include a mechanical transmission as the primary driver of the vehicle and use hydraulic assist motors to selectively drive additional wheels. For example, such a vehicle may have rear wheels driven by the mechanical transmission and front steerable wheels that are selectively driven by hydraulic assist motors. When being driven on a paved road, such a vehicle will typically employ only the mechanical transmission. When the vehicle must be driven in poor traction or off-road conditions, e.g., when on a construction site, it can be beneficial to employ the hydraulic assist motors to provide the vehicle with an additional set of driven wheels.

As a general rule, the hydraulic assist motors employed in such vehicles are subject to damage if the pistons of the motors are not retracted when the motors are de-activated and the vehicle is in motion, e.g., traveling on a paved road. While various hydraulic circuits are known for use with such selectively actuated hydraulic motors, such circuits often rely on highly complex valves that require extensive custom machining and, thus, can be quite expensive.

SUMMARY OF THE INVENTION

The present invention provides a hydraulic circuit with a plurality of valves for controlling the operation of at least one hydraulic motor wherein the valves may take the form of relatively simple and inexpensive solenoid cartridge valves.

The invention comprises, in one form thereof, a hydraulic circuit (22, 23) that includes at least one hydraulic motor (24) and a first hydraulic discharge pump (62, 162). The motor (24) defines a motor cavity (54) and includes at least one piston (40) at least partially disposed within a piston bore (42) and moveable between an extended position and a retracted position (40R). The piston (40) permits free rotation of the motor (24) when in the retracted position. The first hydraulic pump (62, 162) has a selectively variable discharge. Hydraulic fluid can be recirculated through a first loop within the circuit (22). The first loop includes, in serial order, the first hydraulic pump (62, 162), a first hydraulic line (94), said hydraulic motor (24) and a second hydraulic line (96). A third hydraulic line (98) provides fluid communication between the first hydraulic line (94) and a first valve (86). A fourth hydraulic line (118) provides fluid communication between the second hydraulic line (96) and a second valve (88). A fifth hydraulic line (lines 126, 130, 132 combined) provides fluid communication between the first and second valves (86, 88). The first valve (86) has an open position (FIG. 2) permitting bi-directional fluid communication between the third (98) and fifth (126, 130, 132) hydraulic lines and a closed position (FIG. 5) preventing fluid communication from the third hydraulic line (98) to the fifth hydraulic line (126, 130, 132). The second valve (88) has an open position (FIG. 2) permitting bi-directional fluid communication between the fourth (118) and fifth (126, 130, 132) hydraulic lines and a closed position (FIG. 5) preventing fluid communication from the fourth (118) hydraulic line to the fifth hydraulic line (126, 130, 132). A sixth hydraulic line (100, 101) receives a hydraulic fluid discharge from either a constant source of low pressure hydraulic fluid or a second hydraulic pump (64, 65) and provides fluid communication between the second hydraulic pump (64, 65) and a third valve (84, 85). A seventh hydraulic line (120, 142) provides fluid communication between the third valve (84, 85) and the motor cavity (54). The third valve (84, 85) has a first position (FIG. 2, FIG. 6) providing fluid communication from the sixth hydraulic line (100, 101) to the seventh hydraulic line (120, 142) and a second position (FIG. 3) preventing fluid communication from the sixth hydraulic line (100, 101) to the seventh hydraulic line (120, 142). When the first hydraulic pump (62, 162) is discharging at no greater than a minimal discharge rate and the third valve (84, 85) is in its first position, hydraulic fluid pressure within the motor cavity (54) moves the at least one piston (40) into its retracted position. The at least one piston (40) is moveable into its extended position by moving the third valve (84, 85) into its second position and positioning each of the first and second valves (86, 88) in their open positions and operating the second pump (64, 65). The motor 24 may be driven/is actuable after extending the at least one piston (40) by moving each of the first and second valves (86, 88) into their closed positions and operating the first hydraulic pump (62, 162) at a discharge rate greater than said minimal discharge rate.

In some embodiments, the hydraulic circuit (22, 23) also includes a hydraulic fluid storage vessel (60) wherein the second pump (64, 65) receives fluid (via lines 102, 140) from the storage vessel (60). An eighth hydraulic line (122, 123) provides fluid communication between the motor bearings and/or cavity (54) and the storage vessel (60).

In other embodiments, the hydraulic circuit (22, 23) further includes a ninth hydraulic line (124, 125) providing fluid communication between the third valve (84, 85) and the storage vessel (60) wherein the third valve (84, 85) provides fluid communication between the seventh (120, 144) and ninth (124, 125) hydraulic lines when the third valve (84, 85) is in its second position.

In still other embodiments, the hydraulic circuit (22, 23) includes a fourth valve (90). The fourth valve (90) has an open position allowing fluid communication from the fifth hydraulic line (126, 130, 132) to the ninth hydraulic line (124, 125) and a closed position preventing fluid communication from the fifth hydraulic line (126, 130, 132) to the ninth hydraulic line (124, 125). The fourth valve (90) is positioned in its open position when the at least one piston (40) is in its retracted position. The fourth valve (90) is moved to its closed position when extending the at least one piston (40) and actuating the at least one hydraulic motor (24).

In yet additional embodiments, the hydraulic circuit (22, 23) includes a one-way check valve (92) disposed between the fifth (126, 130, 132) and sixth (100, 101) hydraulic lines. The one-way check valve (92) allows fluid communication from the sixth hydraulic line (100, 101) to the fifth hydraulic line (126, 130, 132) and prevents fluid communication from the fifth hydraulic line (126, 130, 132) to the sixth hydraulic line (100, 101).

The first (86), second (88), third (84, 85) and fourth (90) valves may advantageously take the form of solenoid activated valves.

In still other embodiments of the invention, the circuit (22, 23) may include a tenth hydraulic line (108, 125) providing fluid communication between the sixth hydraulic line (100, 101) and a storage vessel (60) wherein a pressure relief valve (66, 67) is disposed in the tenth hydraulic line (108, 125) and releases hydraulic fluid from the sixth hydraulic line (100, 101) toward the storage vessel (60) when the fluid pressure within the sixth hydraulic line (100, 101) exceeds a predetermined threshold value.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Figure 1:
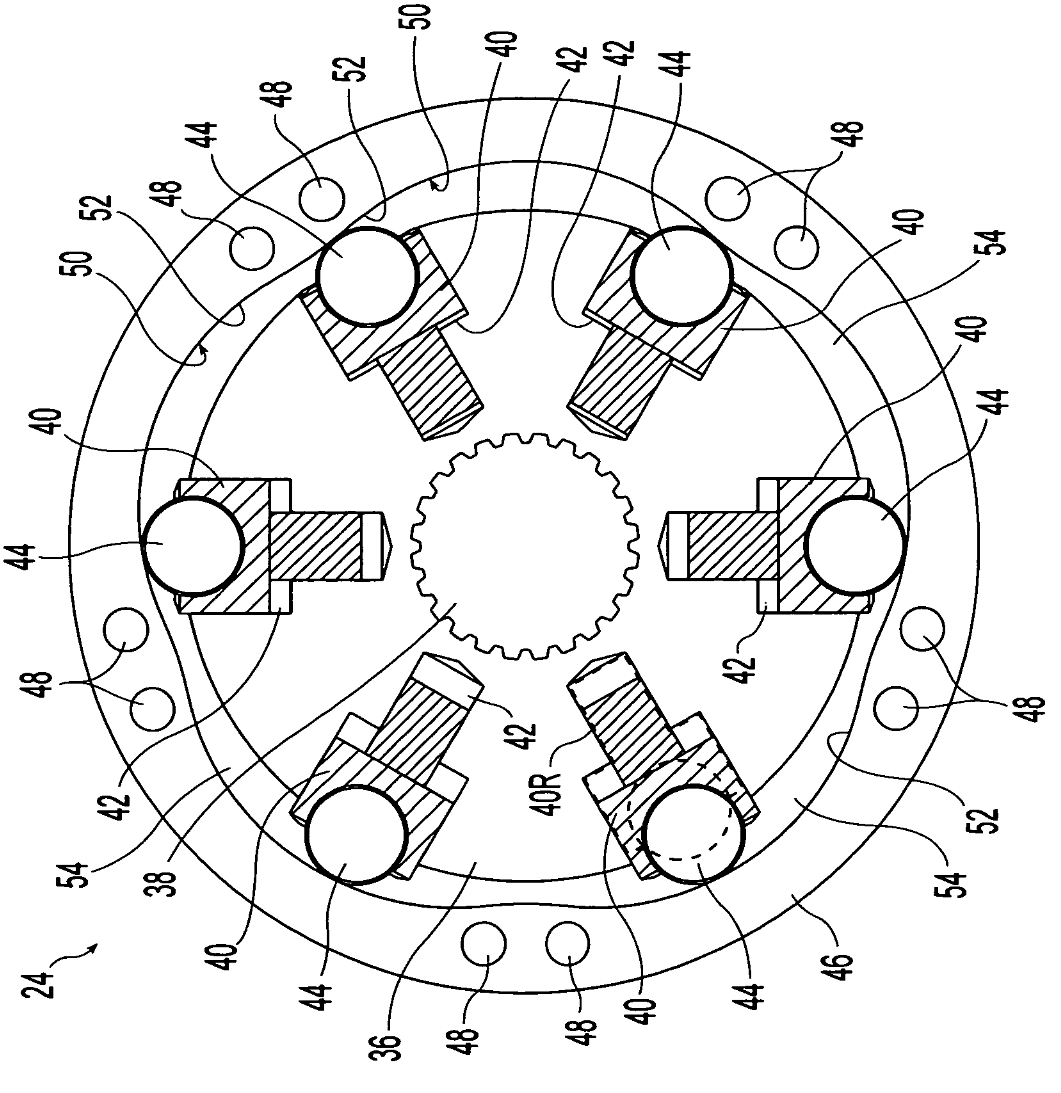
FIG. 1 is a cross sectional view of a hydraulic motor.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

Figure 2:
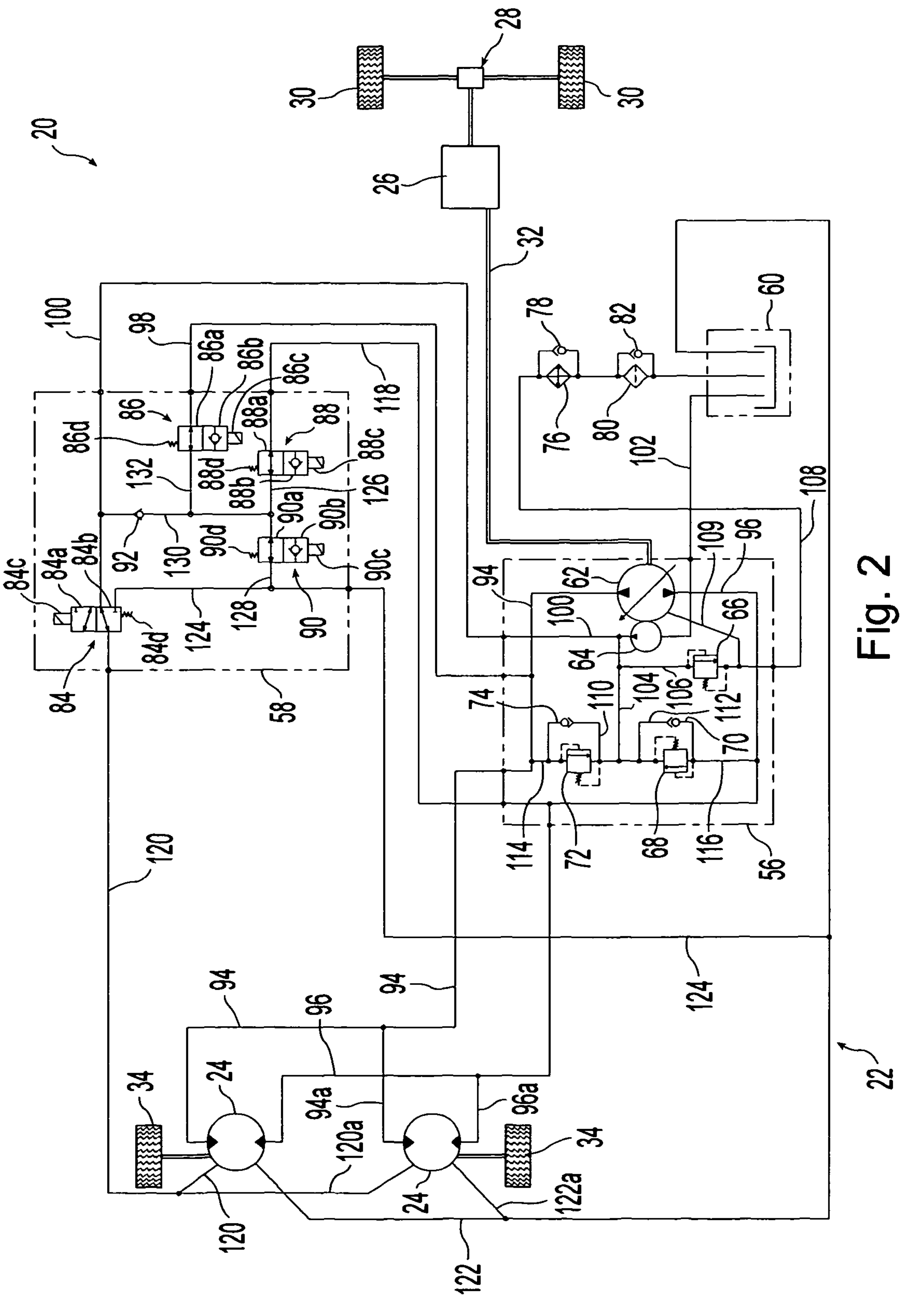
FIG. 2 is a schematic view of a vehicle with a hydraulic system and hydraulic power assist motors wherein the pistons of the motors have been retracted for free-wheeling operation.

A vehicle 20 having a hydraulic circuit 22 that includes two hydraulic motors 24 is schematically depicted in FIG. 2. The depicted vehicle 20 is a truck having an internal combustion engine 26 that drives wheels 30 by means of a mechanical power train 28. Engine 26 powers hydraulic circuit 22 through a schematically depicted power-take-off ("PTO") shaft 32. As discussed in greater detail below, hydraulic circuit 22 selectively powers hydraulic motors 24. When actuated, hydraulic motors 24 drive wheels 34.

When vehicle 20 is operating, power train 28 and wheels 30 provide the primary driving wheels for vehicle 20 while motors 24 and wheels 34 provide a pair of auxiliary drive wheels for use when vehicle 20 is being operated in poor traction conditions, on rough terrain, or in other circumstances in which providing additional drive wheels is advantageous. In the illustrated embodiment, wheels 34 are steerable wheels while wheels 30 are non-steerable wheels. The present invention, however, may be used with a variety of other vehicles. For example, hydraulic motors 24 can also be used with non-steerable wheels and the primary drive system of the vehicle could employ a hydraulic circuit with hydraulic motors located between engine 26 and primary drive wheels 30 rather than a mechanical power train.

After discussing the general structure and operation of hydraulic motors 24, the structure and operation of hydraulic circuit 22 within which hydraulic motors 24 are located will be discussed.

The illustrated hydraulic motors 24 used in hydraulic circuit 22 are conventional hydraulic motors and a cross sectional view of hydraulic motors 24 is provided in FIG. 1. Motor 24 includes a cylinder block 36 mounted on the spindle 38 of a steering knuckle. Cylinder block 36 is fixed to spindle shaft 38 with splines that prevent cylinder block 36 from rotating. Camming pistons 40 are mounted within piston bores 42 located in cylinder block 36 and have a rolling cam member 44 mounted on their projecting end. Rolling cam members 44 are engaged with cam ring 46 and drivingly rotate cam ring 46 during operation of hydraulic motor 24. A valve assembly (not shown) located at the distal end of spindle shaft controls the flow of hydraulic fluid to the individual piston bores 42 located within cylinder block 46 to thereby control the operation of motor 24.

Cam ring 46 is secured to a conventional wheel hub assembly (not shown) by inserting fasteners through holes 48 in cam ring 46. A wheel 34 is mounted on the wheel hub assembly whereby operation of each of the hydraulic motors 24 drivingly rotates one of the wheels 34.

As can be seen in FIG. 1, the radially inner surface 50 of cam ring 46 includes a series of sloped camming surfaces 52. When inner surface 50 is engaged with rolling cam members 44, camming pistons 40 reciprocate within bores 42 as rolling cam members 44 travel across sloped camming surfaces 52. An internal motor valve assembly controls the flow of high pressure hydraulic fluid to bores 42 and the return of low pressure hydraulic fluid from bores 42.

During operation of motor 24, high pressure hydraulic fluid will be supplied to some of the bores 42 forcing the pistons 40 and rolling cam members 44 associated with those bores 42 radially outwardly while other pistons 40 and cam members 44 are being forced radially inwardly and expelling relatively low pressure hydraulic fluid. As one having ordinary skill in the art will understand, this will drivingly rotate camming ring 46 and wheel 34 mounted thereon. By altering the sequence in which piston bores 42 receive the high pressure hydraulic fluid, camming ring 46 can be driven in either rotational direction and thereby selectively rotate wheels 34 in either the forward or reverse direction.

As discussed in greater detail below, the hydraulic fluid for driving pistons 40 is supplied to and returned from motors 24 through hydraulic lines 94, 94*a* and 96, 96*a*. When high pressure hydraulic fluid is supplied to motors 24 through lines 94, 94*a* and reduced pressure hydraulic fluid returned through lines 96, 96*a*, motors 24 will rotate cam rings 46 and wheels 34 in one direction, e.g., forward. When high pressure hydraulic fluid is supplied to motors through lines 96, 96*a* and reduced pressure hydraulic fluid returned through lines 94, 94*a*, motors 24 will rotate cam rings 46 and wheels 34 in the opposite direction, e.g., reverse.

It is sometimes desirable to have the ground engaging wheels 34 secured to motors 24 rotate freely without having hydraulic motors 24 powering the rotation of wheels 34. During such periods of free wheel rotation or "roading," pistons 40 are retracted so that rolling cam members 44 do not interfere with the rotation of cam ring 46. As discussed in greater detail below, retraction of pistons 40 is accomplished by reducing the flow and pressure of the hydraulic oil communicated to all of the piston bores 42 while maintaining the hydraulic oil within motor case cavities 54 at a greater pressure. Hydraulic lines 120, 120*a* are in communication with motor case cavity 54 and, as discussed in greater detail below, are used to regulate the pressure of hydraulic fluid within motor case cavities 54. In FIG. 1, pistons 40 are illustrated in their extended positions in solid lines. The retracted position of one of the pistons is depicted in dashed lines designated 40R.

When free-wheeling, the pressure of the oil located between camming ring 46 and cylinder block 36 is regulated not only to maintain the pressure at a value that keeps pistons 40 retracted but also to replace the volume of oil seeping from motor 24. The motor seepage oil cools and lubricates bearings (not shown) located on spindle shaft 38. After lubricating the bearings, this seepage oil is advantageously returned by internal passages to lines 122, 122*a* by which it is conveyed to tank 60. The circulation of seepage oil occurs when vehicle 20 is operating with motors 24 in a free-wheeling configuration with pistons 40 retracted and when motors 24 are operating and driving wheels 34.

The general structure of hydraulic circuit 22 will now be discussed with reference to FIG. 2. Hydraulic circuit 22 includes a pump module 56, a control valve module 58 and an oil tank 60. The pump and control valve modules 56, 58 comprise a plurality of individual components and can be installed as modular units 56, 58 in vehicle 20 or the separate components forming modules 56, 58 can be installed individually.

Pump module 56 includes a reversible variable displacement pump 62 and a charge pump 64 that are powered by PTO shaft 32. PTO shaft 32 drives pumps 62, 64 whenever engine 26 is operating. Charge pump 64 is a constant displacement pump and discharges hydraulic oil at a substantially constant pressure. In the illustrated embodiment, charge pump 64 discharges hydraulic oil at a pressure that remains substantially constant at about 400 psi. Variable displacement pump 62 discharges oil at variable quantities and pressures.

Hydraulic lines 94, 96 act as the inflow and discharge lines for variable displacement pump 62. The illustrated variable displacement pump 62 is a selectively reversible pump. Thus, pump 62 has two operating conditions: one in which line 96 is the inflow line and line 94 is the discharge line and another one in which line 94 is the inflow line and line 96 is the discharge line.

Lines 94 and 96 lead to ports on each of the hydraulic motors 24 either directly or through branch lines 94*a*, 96*a*. The pumps 24 are arranged in parallel. Lines 94, 96 and 94*a*, 96*a* are in communication with the internal valve assembly within motors 24 that feed and drain hydraulic fluid from cylinder bores 42. As mentioned above, when high pressure hydraulic fluid is provided to motors 24 through hydraulic lines 94, 94*a* and reduced pressure hydraulic fluid is returned to pump 62 through lines 96, 96*a*, pumps 24 will operate in a first rotational direction. When pump 62 is reversed and high pressure fluid is provided to motors 24 through hydraulic lines 96, 96*a* and reduced pressure hydraulic fluid is returned to pump through lines 94, 94*a*, motors 24 will operate in the opposite rotational direction. Because the hydraulic fluid is returned directly to pump 62 from motors 24, hydraulic system 22 is referred to as a closed system.

Hydraulic line 94 (and pump 62) is also in communication with valve cartridge 86 through hydraulic line 98. Similarly, hydraulic line 96 (and the opposite side of pump 62) is in communication with valve cartridge 88 through hydraulic line 118. The purpose of hydraulic lines 98, 118 and valve module 58 is discussed in greater detail below.

Charge pump 64 receives hydraulic fluid from tank 60 through hydraulic line 102 and discharges hydraulic fluid into hydraulic line 100. Hydraulic line 100 connects charge pump 64 with valve cartridge 84. Valve cartridge 84 is also in fluid communication with motor case cavities 54 of motors 24 through hydraulic lines 120, 120*a* and with tank 60 through hydraulic line 124.

Hydraulic line 104 is in communication with discharge line 100 and provides fluid communication to pressure relief valve 66 via hydraulic line 106. Hydraulic oil flowing through pressure relief valve 66 enters hydraulic line 108 which conveys the hydraulic oil toward tank 60. In the illustrated embodiment, pressure relief valve 66 is set such that the pressure within discharge line 100 will not exceed a pressure of approximately 50 psi. Charge pump 64 has a substantially constant discharge rate with a discharge pressure of approximately 400 psi. When pump 64 is discharging fluid into line 100, a fraction of this discharge flow will, thus, flow through pressure relief valve 66 into hydraulic line 108.

Hydraulic fluid entering hydraulic line 108 passes through oil cooler 76 and oil filter 80 before entering tank 60. Oil cooler 76 includes an internal bypass valve 78 that allows hydraulic fluid to bypass cooler 76 and continue flowing toward tank 60 if cooler 76 becomes clogged. Similarly, oil filter 80 includes an internal bypass valve 82 that allows hydraulic fluid to bypass filter 80 and continue flowing toward tank 60 if filter 80 becomes clogged. It is also noted that hydraulic line 109 conveys seepage oil from pump 62 to line 108 where it enters the flow of hydraulic oil being conveyed to tank 60. The volume of hydraulic fluid conveyed through oil seepage lines 109 and lines 122, 122*a* is relatively minimal compared with the volumes of hydraulic oil conveyed through the discharge ports of pumps 62, 64.

The discharge flow from charge pump 64 is also communicated through discharge line 100 and line 104 to hydraulic lines 110 and 112 and, thus, one-way by-pass valves 74 and 70. By-pass valve 74 is positioned parallel with pressure relief valve 72 with both valves 74 and 72 positioned between hydraulic line 94 (via hydraulic line 114) and hydraulic line 100 (via hydraulic line 104). Pressure relief valve 72 is positioned to relieve the pressure within hydraulic line 94 if it exceeds a predetermined threshold, e.g., a pressure that would damage pump 62 or motors 24. Pressure relief valve 72 will allow the flow of hydraulic fluid from line 94 into hydraulic line 104 where it can flow through hydraulic line 106, pressure relief valve 66 and into hydraulic line 108 which will convey the fluid to tank 60. If the pressure within line 94 becomes excessively low relative to hydraulic line 100, one-way valve 74 will allow the passage of hydraulic fluid from line 100 through lines into hydraulic line 94 via the interconnecting hydraulic lines 104, 110 and 114.

Similarly, by-pass valve 70 is positioned parallel with pressure relief valve 68 with both valves 70 and 68 positioned between hydraulic line 96 (via hydraulic line 116) and hydraulic line 100 (via hydraulic line 104). Pressure relief valve 68 is positioned to relieve the pressure within hydraulic line 96 if it exceeds a predetermined threshold, e.g., a pressure that would damage pump 62 or motors 24. Pressure relief valve 68 will allow the flow of hydraulic fluid from line 96 into hydraulic line 104 where it can flow through hydraulic line 106, pressure relief valve 66 and into hydraulic line 108 which will convey the fluid to tank 60. If the pressure within line 96 becomes excessively low relative to hydraulic line 100, one-way valve 70 will allow the passage of hydraulic fluid from line 100 into hydraulic line 96 via the interconnecting hydraulic lines 104, 112 and 116.

As mentioned above, hydraulic line 118 is in fluid communication with valve cartridge 88. Hydraulic line 126 extends between valve cartridge 88 and valve cartridge 90. Valve cartridge 90 is, in turn, in fluid communication with hydraulic line 124 through hydraulic line 128. Hydraulic line 130 extends between line 126 and hydraulic line 100 and includes a one-way check valve 92. Hydraulic line 132 provides fluid communication between hydraulic line 130 and valve cartridge 86. Check valve 92 is positioned so that it prevents hydraulic fluid from lines 126 and 132 from entering hydraulic line 100. If the pressure within hydraulic line 100 exceeds the pressure within line 130, check valve 92 will open allowing hydraulic fluid from line 100 to enter line 130. Once such fluid has entered line 130, the flow of the fluid will depend, in part, on the positions of valves 86, 88 and 90.

Valve cartridges 84, 86, 88 and 90 are commonly available conventional valve cartridges. The use of valve cartridges 84, 86, 88 and 90 in the arrangement depicted in FIGS. 2-6, allows the operation of motors 24 to be controlled without the use of a highly complex and, thus expensive, custom valve. Valve cartridge 84 includes first and second valve arrangements 84*a*, 84*b*, a solenoid 84*c* and a biasing member 84*d*. Hydraulic lines 100, 120 and 124 will be in communication with either valve arrangement 84*a* or 84*b*. Biasing member 84*d* urges cartridge valve 84 into a position wherein valve arrangement 84*b* is in communication with lines 100, 120 and 124 while the activation of solenoid 84*c* will place valve arrangement 84*a* into communication with hydraulic lines 100, 120, 124. Valve arrangement 84*a* provides fluid communication between lines 120 and 124 and terminates hydraulic line 100. Valve arrangement 84*b* provides fluid communication between lines 100 and 120 and terminates hydraulic line 124.

Valve cartridges 86, 88 and 90 each have a common structure with two valve arrangements 86*a*, 86*b*; 88*a*, 88*b*; 90*a*, 90*b*, a solenoid 86*c*, 88*c*, 90*c* and a biasing member 86*d*, 88*d*, 90*d*. The biasing members 86*d*, 88*d*, 88*d* of valve cartridges 86, 88, 90 respectively urge valve arrangements 86*a*, 88*a*, 90*a* into communication with the hydraulic lines connected with the cartridges while activation of solenoids 86*c*, 88*d*, 90*d* will place valve arrangements 86*b*, 88*b*, 90*b* into communication with the hydraulic lines connected with the cartridges. Each of the valve cartridges 86, 88 and 90 are connected with two hydraulic lines and valve arrangements 86*a*, 88*a*, 90*a* provide fluid communication between the two hydraulic lines. Valve arrangements 86*b*, 88*b*, 90*b* each include a one-way check valve. Valve arrangement 86*b* only allows fluid flow from line 132 to line 98, valve arrangement 88*b* only allows fluid flow from line 126 to line 118 and valve arrangement 90*b* only allows fluid flow from line 128 to line 126. Valves 86, 88 and 90 are referred to herein as being "open" when valve arrangements 86*a*, 88*a*, 90*a* are being employed and "closed" when valve arrangements 86*b*, 88*b*, 90*b* are being employed.

The operation of hydraulic circuit 22 and its control of motors 24 will now be discussed with reference to FIGS. 2-5. Turning first to FIG. 2, this figure illustrates hydraulic circuit 22 when motors 24 are in a free-wheeling condition with pistons 40 and rolling cam members 44 retracted so that they do not engage inner surface 50 of cam ring 46 as cam ring 46 rotates about cylinder block 36. In the situation depicted in FIG. 2, i.e., when motors 34 are in a free-wheeling condition, the discharge flow of variable displacement pump 62 will be negligible. Charge pump 64 will, however, be operating and discharging hydraulic fluid at approximately 400 psi. Relief valve 66 will reduce the pressure of the hydraulic fluid within line 100 to approximately 50 psi and re-circulate some of the hydraulic fluid to charge pump 64 through line 108, tank 60 and line 102. Valve arrangement 84*b* of valve cartridge 84 is in communication with hydraulic lines 100, 120 and 124 and thereby allows hydraulic fluid from line 100 to enter lines 120 and 120*a*. Lines 120, 120*a*, in turn, communicate the fluid from charge pump 64 to motor case cavity 54 where it retains pistons 40 and cam members 44 in their retracted positions. Hydraulic fluid entering cavities 54 is returned in part to tank 60 through hydraulic lines 122, 122*a*.

As can also be seen in FIG. 2, valve arrangements 86*a*, 88*a*, 90*a* are all in communication with the hydraulic lines respectively connected with valve cartridges 86, 88, 90. Thus, lines 94, 98, 132, 130, 126, 118 and 96 form a loop with variable displacement pump 62. It is also noted that the position of valve cartridge 90 (in combination with the position of valve cartridges 86, 88) allows fluid within lines 94, 96 to be in communication with tank 60. As can also be seen from FIG. 2, lines 94, 98, 132, 130, 126, 128, 124, 118 and 96 are all in communication with tank 60 when valves 86, 88 and 90 are in the configuration depicted in FIG. 2. As discussed above, the fluid discharged from pump 64, will flow to motor case cavities 54 through lines 100 and 120 and will return to tank 60 through lines 104, 106 and 108. Another fraction of the flow of fluid discharged from pump 64 will flow into lines 94 and 96 through one-way relief valves 70, 74 and 92. For the fluid to pass through these three relief valves, the pressure within the receiving lines must be slightly less than in lines 110, 112 or 100. The fluid passing through these valves will also experience a slight drop in pressure. The greater pressure in motor case 54 relative to bore cavities 42 reflects this pressure drop across one-way valves 70, 74, 92. In other words, the fluid discharged by pump 64 "deadheads" at motor cavities 54 after passing through line 100, valve 84 and line 120/120*a* while the fluid discharged from pump 64 can only enter bores 42 after passing through one of check valves 70, 74 or 92 which ensures that the fluid within bores 42 is at a slightly lower pressure than the fluid in cavities 54. As mentioned above, pump 62 is not supplying high pressure hydraulic fluid to either of lines 94 or 96 in the condition illustrated in FIG. 2.

The operating condition illustrated in FIG. 2 is maintained until it is desired to engage motors 24. To avoid damage to motors 24 a multi-step process is used to transition between the "roading" or free-wheeling operating condition illustrated in FIG. 2 and the condition depicted in FIG. 5 in which motors 24 are driving wheels 34. (Wheels 34, engine 26, PTO shaft 32, mechanical power train 28 and wheels 30 have been omitted from FIGS. 3-5 for purposes of graphical clarity.)

Figure 3:
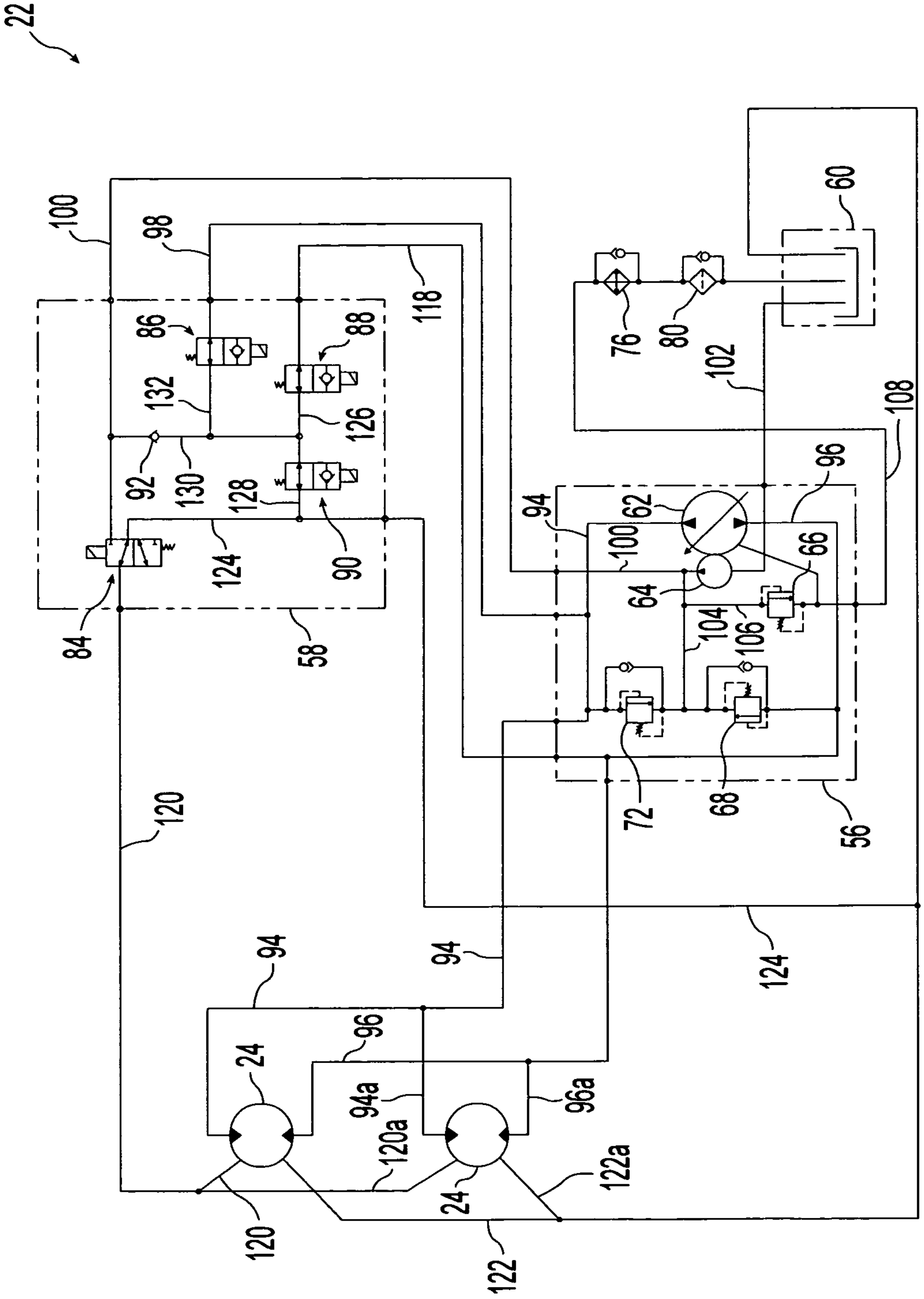
FIG. 3 is a schematic view of the hydraulic system of FIG. 2 wherein the hydraulic pressure within the motor cases has been released to the hydraulic tank.

FIG. 3 illustrates the first step in the transition process from free-wheeling to hydraulic motor actuated conditions. This transition process is implemented using a conventional electronic controller (not shown). Such controllers are typically found in vehicles employing hydraulic drive assist motors and, as one having ordinary skill in the art will understand, such controllers can be programmed to operate solenoids 84*c*, 86*d*, 88*d*, 90*d* and pump 62 in the manner described below to implement the transition process from a free-wheeling mode to a power assist mode and from a power assist mode to a free-wheeling mode.

As can be seen in FIG. 3, solenoid 84*c* of valve cartridge 84 has been activated and valve arrangement 84*a* now connects hydraulic fluid line 120 with line 124 and hydraulic line 100 in communication with charge pump 64 has been capped. In this configuration, the fluid pressure within motor case cavities 54 will fall as fluid within cavities 54 drains to tank 60 due to the fluid communication between cavities 54 and tank 60 provided by hydraulic lines 120, 124. As a result, the pressure within motor cavities 54 and cylinder bores 42 will equalize. The hydraulic fluid being discharged by charge pump 64 will be re-circulated primarily through a loop defined by line 100, line 106, line 108, cooler 76, filter 80, tank 60 and line 102. Some of the fluid discharged by pump 64 will also flow through check valves 92, 70 and 72 and will return to tank 60 through lines 124, 122 after passing through valve 90. After circuit 22 has had sufficient time to release the motor case pressure to tank 60, the transition process will move to the condition shown in FIG. 4. It is also possible, however, for the transition process to move to the condition shown in FIG. 4 while the pressure within cavity 54 is still be relieved.

Figure 4:
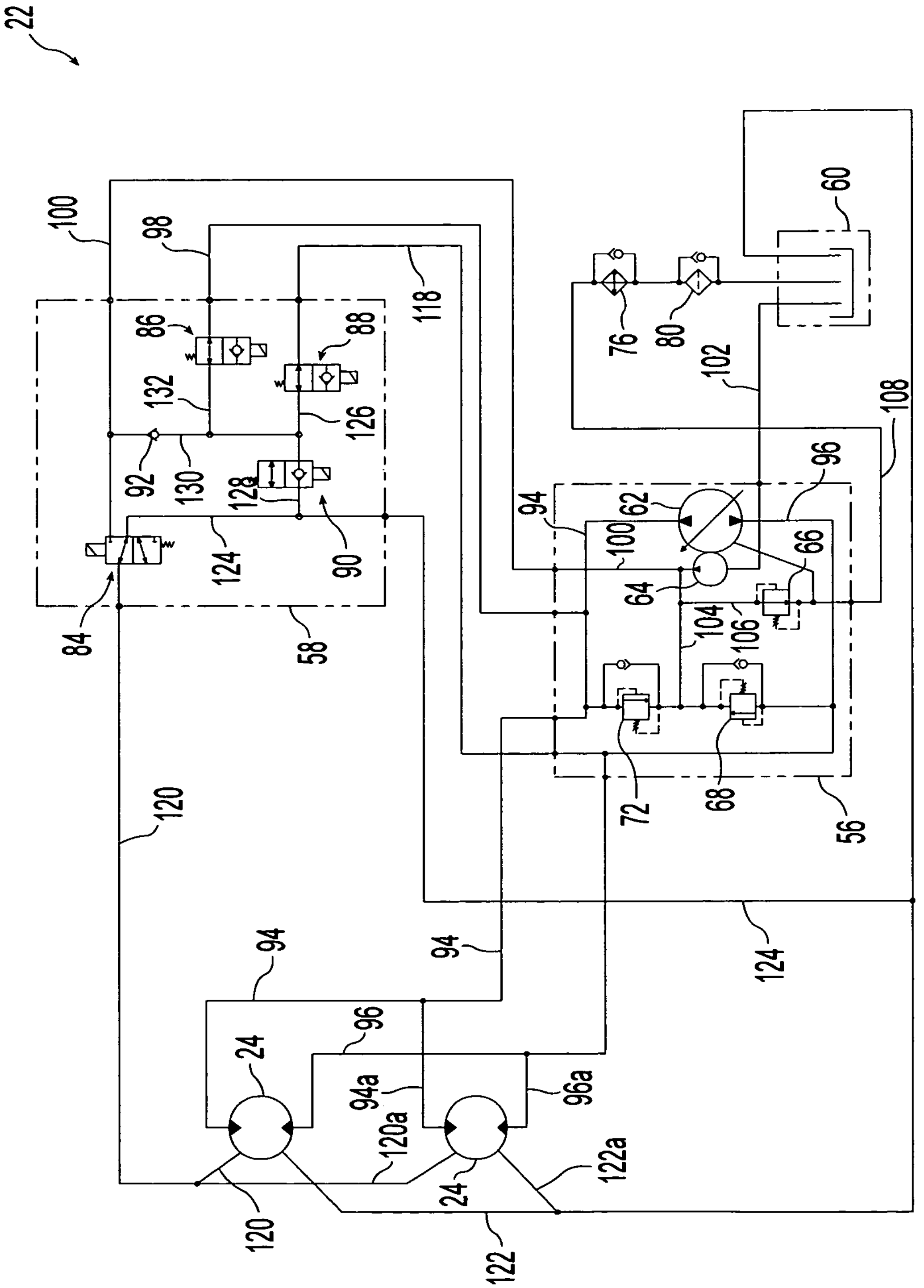
FIG. 4 is a schematic view of the hydraulic system of FIG. 2 wherein the pistons of the hydraulic motors have been extended.

FIG. 4 represents the conditions under which pistons 40 are extended and rolling cam members 44 are re-engaged with inner surface 50 of camming ring 46. In this step of the process, cartridge valve 90 is "closed," i.e., valve arrangement 90*b*, with its one-way valve, is placed in communication with lines 126 and 128 thereby preventing hydraulic fluid from line 126 from entering lines 128 and 124 and returning to tank 60. Cartridge valves 84, 86 and 88 remain in the same positions as in FIG. 3. Pump 62 is discharging no more than a minimal flow of fluid in the condition shown in FIG. 4. Charge pump 64 is always operating when vehicle 20 is running and, thus, is still discharging fluid.

Because valve 84 does not allow fluid in line 100 to enter line 120, fluid discharged from pump 64 entering line 100 will pass through one-way check valve 92. With both valve cartridges 86, 88 being in an "open" position, i.e., with valve arrangements 86*a* and 88*a* providing fluid communication between lines 98 and 132 and between lines 118 and 126 respectively, fluid flowing from line 100 into line 130 and then lines 126 and 132 will pass through valves 86 and 88 and enter lines 98 and 118. After entering lines 98 and 118 the fluid will be in communication with lines 94/94*a* and 96/96*a*.

Because valve cartridges 86, 88 are each in an "open" position, fluid within line 98, and lines 94/94*a* which are in fluid communication therewith, and line 118, and lines 96/96*a* which are in fluid communication therewith, will all substantially equalize. Thus, the fluid pressure within lines 94/94*a* and 96/96*a* will also be increased and motors 24 will experience a fluid pressure increase in piston bores 42. This increase in the fluid pressure will extend pistons 40 and re-engage rolling cam members 44 with camming surface 50. Because the increased pressure in lines 94/94*a* is substantially equivalent to the increased pressure in lines 96/96*a*, motors 24 will not experience a pressure differential between lines 96 and 94 or between lines 96*a* and 94*a* and the increased fluid pressure in piston bores 42 will not cause motors 24 to rotate due to hydraulic pressure. The motors 24 may, however, be rotating due to motion of the vehicle.

Figure 5:
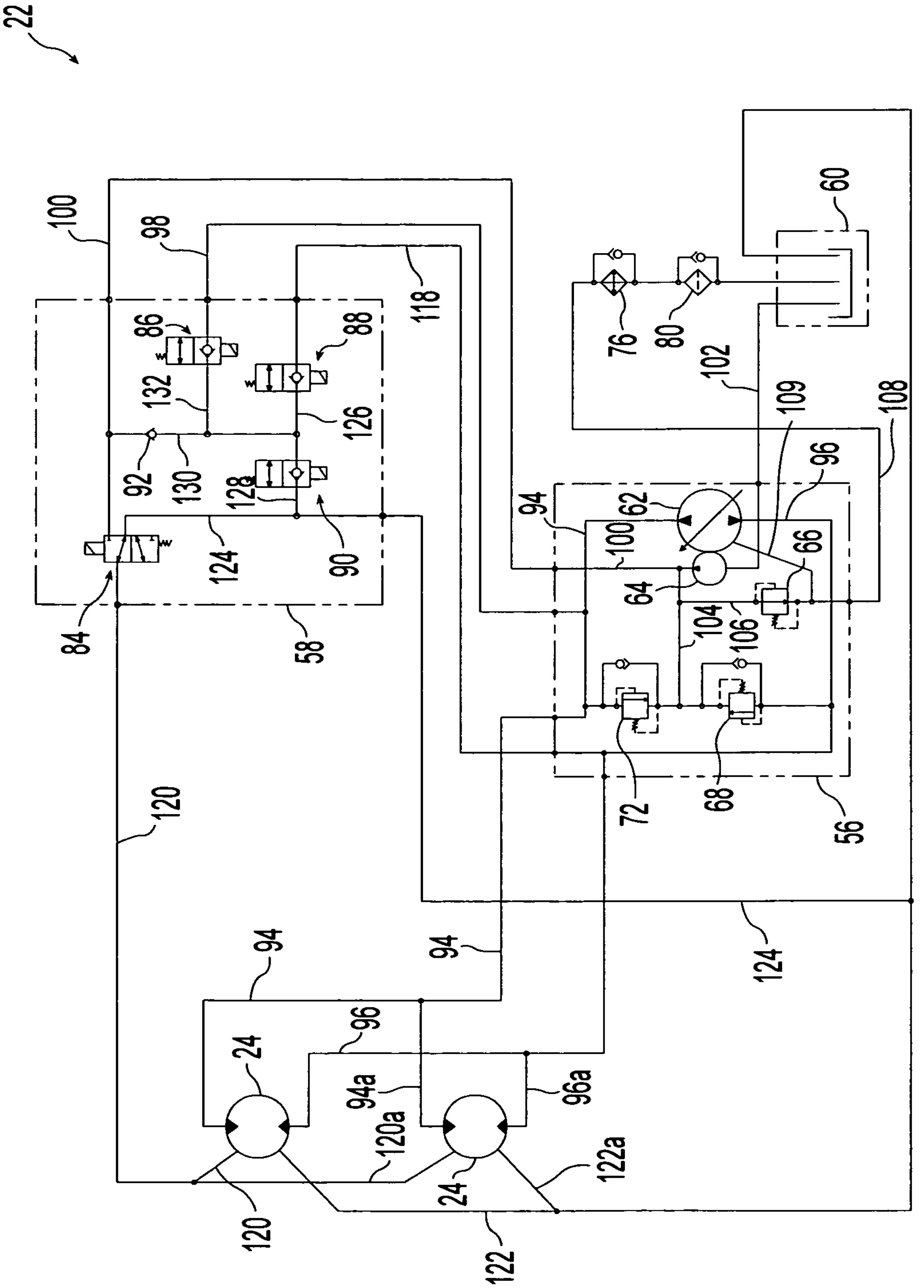
FIG. 5 is a schematic view of the hydraulic system of FIG. 2 wherein the hydraulic motors are operating.

FIG. 5 represents the condition in which motors 24 are operating and driving the rotation of wheels 34. After extending pistons 40, as depicted in FIG. 4, cartridge valves 86 and 88 are "closed" to separate the hydraulic lines supplying high pressure hydraulic fluid to motors 24. The discharge of pump 62 is then increased. to actuate motors 24. Cartridge valves 84 and 90 remain in the same position shown in FIG. 4. To "close" valves 86 and 88, solenoids 86*c* and 88*c* are activated and valve arrangements 86*b* and 88*b* are placed in communication with hydraulic lines 98 and 132 and lines 118 and 126 respectively. Valve arrangement 86*b* prevents the flow of fluid from line 98 (which in communication with pump 62 via line 94) to line 132 while valve arrangement 88*b* prevents the flow of fluid from line 118 (which is in communication with the opposite side of pump 62 via line 96) to line 126.

After closing valves 86, 88, hydraulic lines 94/94*a* and 96/96*a* form a closed loop that includes pump 62 and motors 24 with motors 24 being arranged in parallel. Depending upon which direction pump 62 is pumping either line 94/94*a* will be a high pressure discharge line with line 96/96*a* being a relatively low pressure return line, or, line 96/96*a* will be a high pressure discharge line with line 94/94*a* being a relatively low pressure return line. The pressure differential and fluid flow across motors 24 in this situation will cause motors 24 to rotate and drive wheels 34. The direction of rotation of motors 24 will depend upon the direction in which pump 62 is operating.

Seepage oil and oil from cavity 54 is returned to tank 60 through lines 109, 122, 122*a* and 124 in the motor operation condition depicted in FIG. 5. Charge pump 64 draws hydraulic oil from tank 60 and replaces the seepage losses by introducing hydraulic oil into the closed loop formed by pump 62, hydraulic lines 94/94*a* and 96/96*a* and motors 24 into the return line through either valve 70 or valve 74 depending upon the direction of operation of pump 62. The hydraulic oil will enter the closed loop through valve 70 and into hydraulic line 96 if hydraulic line 96 is acting as the low pressure inlet line to pump 62 and it will enter the closed loop through valve 74 and into hydraulic line 94 if hydraulic line 94 is acting as the low pressure inlet line to pump 62.

When it is desirable to stop the operation of motors 24 and return to the free-wheeling condition depicted in FIG. 2, the discharge volume of pump 62 is first reduced to a negligible amount to reduce the fluid pressure within piston bores 42. Valve cartridges 86, 88 and 90 are then opened (placing valve arrangements 86*a*, 88*a*, 90*a* in communication with their respective hydraulic lines) to allow the pressure within lines 94/94*a* and 96/96*a* to substantially equalize and drain to tank 60 through line 124. Valve 84 is then shifted to place valve arrangement 84*b* into communication with hydraulic lines 100, 120 and 124. Valve arrangement 84*b* allows hydraulic fluid discharged from charge pump 64 to enter motor case cavities 54 through lines 100 and 120/120*a* and thereby force the retraction of pistons 40 and rolling cam members 44 and placing circuit 22 in the condition shown in FIG. 2.

Figure 6:
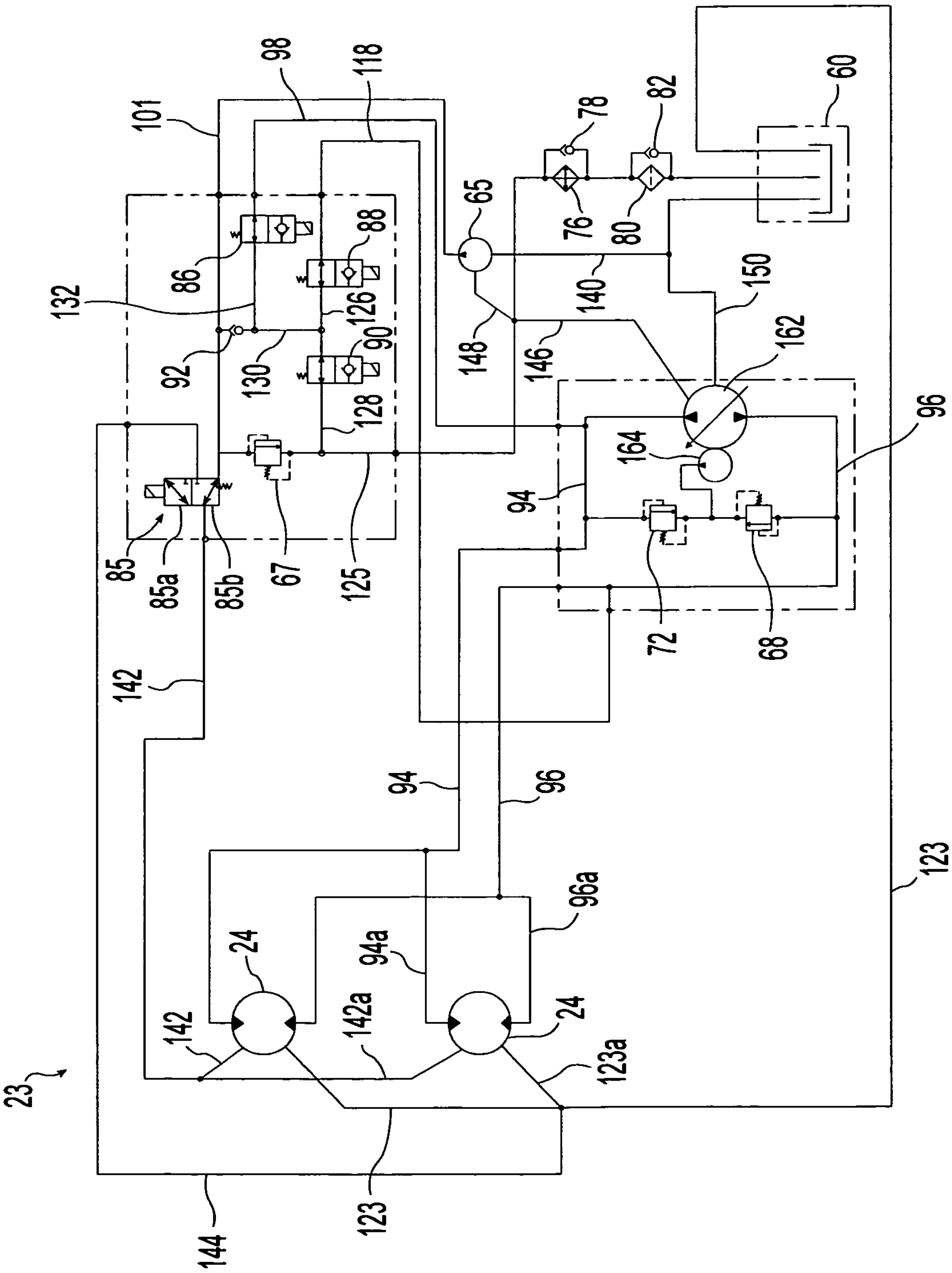
FIG. 6 is a schematic view of an alternative hydraulic system having hydraulic power assist motors.

FIG. 6 illustrates a slightly modified version of the hydraulic circuit shown in FIGS. 2-5. The most significant difference between the hydraulic circuit 23 shown in FIG. 6 and the hydraulic circuit 22 of FIGS. 2-5 is that variable displacement pump 162 and charge pump 164 illustrated in FIG. 6 are only operated when it is desirable to have pump 162 operating. A second charge pump 65 is operated whenever the vehicle engine 26 is running.

FIG. 6 illustrates the free-wheeling condition. In this condition, pumps 162 and 164 will not be operating and only charge pump 65 will be operating. Charge pump 65 draws hydraulic fluid from tank 60 through line 140 and discharges it into hydraulic line 101. Line 101 is in communication with hydraulic line 125 and valve cartridge 85. Hydraulic line 125 includes a pressure relief valve 67 that limits the pressure within line 101 to approximately 50 psi. Fluid passing through valve 67 passes through oil cooler 76 and oil filter 80 and is returned to tank 60.

With regard to the control valves for circuit 23, valves 86, 88, 90 and 92 all operate in the same manner as described above with reference to FIGS. 2-5. Valve cartridge 85 and its connection with the hydraulic circuit, however, do differ somewhat from valve cartridge 84 and its connections. Hydraulic lines 142, 142*a* provide fluid communication between valve 85 and motor case cavities 54. When valve cartridge 85 is in the position shown in FIG. 6 (with valve arrangement 85*b* in communication with lines 101, 142 and 144), lines 142, 142*a* will communicate hydraulic fluid from line 101 to cavities 54 to retain pistons 40 in their retracted positions within motors 24. Hydraulic lines 123 and 123*a* are similar to lines 122, 122*a* of FIGS. 2-5 and return seepage oil from motors 24 to tank 60. Hydraulic line 144 extends between line 123 and valve 85 and, when valve cartridge 85 is shifted to place valve arrangement 85*a* into communication with lines 101, 142 and 144, lines 144 and 142 will provide communication between cavities 54 and tank 60 in addition to lines 123 and 123*a*.

Hydraulic lines 146 and 148 are oil seepage lines that are in communication with line 125 and return pump lubricating seepage to tank 60 while hydraulic line 150 is used to provide variable displacement pump 162 with hydraulic oil to replace seepage and other losses when pump 162 is operating. With regard to the replacement of seepage losses, it is noted FIG. 6 provides a simplified schematic view of charge pump 164 and pump 162 and omits showing check valves similar to valves 70 and 74 through which fluid to replace seepage losses can be communicated to pump 162. When pump 162 is operating, hydraulic lines 94/94*a* and 96/96*a*, pump 162 and motors 24 form a closed loop in the same manner discussed above with reference to FIGS. 2-5.

When making the transition from the free-wheeling condition depicted in FIG. 6 to a condition where motors 24 are operating and driving wheels 34, circuit 23 undergoes similar steps to those discussed above with reference to FIGS. 2-5. Initially, valve 85 is shifted to place valve arrangement 85*a* into communication with lines 101, 142 and 144. This terminates the flow of hydraulic fluid from line 101 to motor case cavities 54. Termination of this fluid flow causes the motor case cavities 54 to drain to tank 60 through lines 123, 123*a* and through lines 142/142*a*. Lines 142/142*a* will be in communication with tank 60 through valve 85, line 144 and line 123. After the fluid pressure within cavities 54 has been reduced, valve 90 is closed to increase the pressure within bores 42 and extend pistons 40.

After pistons 40 have been extended, valves 86 and 88 are closed to separate the forward and reverse lines 94/94*a* and 96/96*a* feeding motors 24. Pumps 162, 164 are then actuated. A clutch (not shown) is disposed between pumps 162, 164 and the PTO shaft to selectively activate and deactivate pumps 162, 164. The discharge volume of pump 162 is then raised thereby raising the pressure in either hydraulic lines 94/94*a* or in hydraulic lines 96/96*a* depending upon the direction in which pump 162 is operating. As a result of the hydraulic fluid flow through lines 94/94*a* and 96/96*a*, motors 24 will begin operating and driving wheels 34 in either a forward or reverse direction depending upon the operating direction of pump 162.

While the illustrated embodiments employed charge pumps in combination with variable displacement pumps 62, 162, alternative embodiments could utilize other constant sources of low pressure hydraulic fluid instead of charge pumps.

While this invention has been described as having an exemplary design, the present invention may be further modified within the spirit and scope of this disclosure. This application is therefore intended to cover any variations, uses, or adaptations of the invention using its general principles.

What is claimed is:

1. A hydraulic wheel drive system comprising:

at least one hydraulic motor adapted to drivingly rotate a vehicle wheel, said motor defining a motor cavity and including at least one piston at least partially disposed within a piston bore and moveable between an extended position and a retracted position, said piston permitting free rotation of said motor when in said retracted position;

a first hydraulic pump having a selectively variable discharge;

a first loop within said circuit, hydraulic fluid being recirculateable through said first loop and said first loop comprises in serial order, said first hydraulic pump, a first hydraulic line, said hydraulic motor and a second hydraulic line;

a third hydraulic line providing fluid communication between said first hydraulic line and a first valve;

a fourth hydraulic line providing fluid communication between said second hydraulic line and a second valve;

a fifth hydraulic line providing fluid communication between said first and second valves wherein said first valve has an open position permitting bi-directional fluid communication between said third and fifth hydraulic lines and a closed position preventing fluid communication from said third hydraulic line to said fifth hydraulic line; and wherein said second valve has an open position permitting bi-directional fluid communication between said fourth and fifth hydraulic lines and a closed position preventing fluid communication from said fourth hydraulic line to said fifth hydraulic line;

a second hydraulic pump;

a sixth hydraulic line receiving a hydraulic fluid from said second hydraulic pump and providing fluid communication between said second hydraulic pump and a third valve; and, a seventh hydraulic line providing fluid communication between said third valve and said motor cavity wherein said third valve has a first position providing fluid communication from said sixth hydraulic line to said seventh hydraulic line and a second position preventing fluid communication from said sixth hydraulic line to said seventh hydraulic line.

2. The hydraulic wheel drive system of claim 1 further comprising:

a hydraulic fluid storage vessel, said second pump having an inlet in fluid communication with said storage vessel.

3. The hydraulic wheel drive system of claim 2 further comprising:

a ninth hydraulic line providing fluid communication between said third valve and said storage vessel; and wherein said third valve provides fluid communication between said seventh and ninth hydraulic lines when said third valve is in said second position.

4. The hydraulic wheel drive system of claim 3 further comprising:

a fourth valve, said fourth valve having an open position allowing fluid communication from said fifth hydraulic line to said storage vessel and a closed position preventing fluid communication from said fifth hydraulic line to said storage vessel.

5. The hydraulic wheel drive system of claim 4 further comprising:

a one-way check valve disposed between said fifth and sixth hydraulic lines, said one-way check valve allowing fluid communication from said sixth hydraulic line to said fifth hydraulic line and preventing fluid communication from said fifth hydraulic line to said sixth hydraulic line and wherein, when said first hydraulic pump is discharging at no greater than a minimal discharge rate and said third valve is in said first position and said fourth valve in is its open position, hydraulic fluid from said second pump through said third valve and said seventh line provides pressure within said motor cavity and moves said at least one piston into said retracted position; and wherein said at least one piston is moveable into said extended position by moving said third valve into said second position and providing fluid communication from said motor cavity, though the seventh line and the third valve to said storage vessel and positioning each of said first and second valves in said open position and positioning the fourth valve in its closed position whereby hydraulic fluid from said second pump is provided from said sixth line through said check valve, said fifth line, said first and second valves to said motor piston bore; and, wherein said motor is actuable after extending said at least one piston by moving each of said first and second valves into said closed position and operating said first hydraulic pump at an elevated discharge rate.

6. The hydraulic wheel drive system of claim 5 further comprising an eighth hydraulic line providing fluid communication between said storage vessel and one of said motor cavity and a motor bearing.

7. The hydraulic wheel drive system of claim 4 wherein each of said first, second, third and fourth valves are solenoid activated valves.

8. The hydraulic wheel drive system of claim 2 further comprising:

a tenth hydraulic line providing fluid communication between said sixth hydraulic line and said storage vessel; and a pressure relief valve disposed in said tenth hydraulic line and releasing hydraulic fluid from said sixth hydraulic line to said storage vessel when the fluid pressure within said sixth hydraulic line exceeds a predetermined threshold value.

9. The hydraulic wheel drive system of claim 1 further comprising:

a one-way check valve disposed between said fifth and sixth hydraulic lines, said one-way check valve allowing fluid communication from said sixth hydraulic line to said fifth hydraulic line and preventing fluid communication from said fifth hydraulic line to said sixth hydraulic line whereby fluid discharged from said second pump is communicated to said fifth hydraulic line through said one-way check valve when said third hydraulic valve is in said second position.

10. The hydraulic wheel drive system of claim 1 wherein said hydraulic wheel drive system is installed in a vehicle, said at least one hydraulic motor comprises first and second hydraulic motors arranged in parallel and said first and second motors selectively drive a pair of steerable wheels.

11. The hydraulic wheel drive system of claim 10 further comprising:

a hydraulic fluid storage vessel, said second pump having an inlet in fluid communication with said storage vessel.

12. The hydraulic wheel drive system of claim 11 further comprising:

a ninth hydraulic line providing fluid communication between said third valve and said storage vessel; and wherein said third valve provides fluid communication between said seventh and ninth hydraulic lines when said third valve is in said second position.

13. The hydraulic wheel drive system of claim 12 further comprising:

a fourth valve, said fourth valve having an open position allowing fluid communication from said fifth hydraulic line to said storage vessel and a closed position preventing fluid communication from said fifth hydraulic line to said storage vessel.

14. The hydraulic wheel drive system of claim 13 further comprising:

a one-way check valve disposed between said fifth and sixth hydraulic lines, said one-way check valve allowing fluid communication from said sixth hydraulic line to said fifth hydraulic line and preventing fluid communication from said fifth hydraulic line to said sixth hydraulic line and wherein, when said first hydraulic pump is discharging at no greater than a minimal discharge rate and said third valve is in said first position and said fourth valve in is its open position, hydraulic fluid from said second pump through said third valve and said seventh line provides pressure within said motor cavity and moves said at least one piston into said retracted position; and wherein said at least one piston is moveable into said extended position by moving said third valve into said second position and providing fluid communication from said motor cavity, though the seventh line and the third valve to said storage vessel and positioning each of said first and second valves in said open position and positioning the fourth valve in its closed position whereby hydraulic fluid from said second pump is provided from said sixth line through said check valve, said fifth line, said first and second valves to said motor piston bore; and, wherein said motor is actuable after extending said at least one piston by moving each of said first and second valves into said closed position and operating said first hydraulic pump at an elevated discharge rate.

15. A hydraulic wheel drive system comprising:

at least one hydraulic motor adapted to drivingly rotate a vehicle wheel, said motor defining a motor cavity and including at least one piston at least partially disposed within a piston bore and moveable between an extended position and a retracted position, said piston permitting free rotation of said motor when in said retracted position;

a first hydraulic pump having a selectively variable discharge;

a first loop within said circuit, hydraulic fluid being recirculateable through said first loop and said first loop comprises in serial order, said first hydraulic pump, a first hydraulic line, said hydraulic motor and a second hydraulic line;

a third hydraulic line providing fluid communication between said first hydraulic line and a first valve;

a fourth hydraulic line providing fluid communication between said second hydraulic line and a second valve;

a fifth hydraulic line providing fluid communication between said first and second valves wherein said first valve has an open position permitting bi-directional fluid communication between said third and fifth hydraulic lines and a closed position preventing fluid communication from said third hydraulic line to said fifth hydraulic line; and wherein said second valve has an open position permitting bi-directional fluid communication between said fourth and fifth hydraulic lines and a closed position preventing fluid communication from said fourth hydraulic line to said fifth hydraulic line;

a source of low pressure hydraulic fluid;

a sixth hydraulic line receiving a hydraulic fluid from said source and providing fluid communication between said source and a third valve; and, a seventh hydraulic line providing fluid communication between said third valve and said motor cavity wherein said third valve has a first position providing fluid communication from said sixth hydraulic line to said seventh hydraulic line and a second position preventing fluid communication from said sixth hydraulic line to said seventh hydraulic line.

16. The hydraulic wheel drive system of claim 15 further comprising:

a ninth hydraulic line providing fluid communication between said third valve and a storage vessel; and wherein said third valve provides fluid communication between said seventh and ninth hydraulic lines when said third valve is in said second position.

17. The hydraulic wheel drive system of claim 16 further comprising:

a fourth valve, said fourth valve having an open position allowing fluid communication from said fifth hydraulic line to said storage vessel and a closed position preventing fluid communication from said fifth hydraulic line to said storage vessel.

18. The hydraulic wheel drive system of claim 17 further comprising:

a one-way check valve disposed between said fifth and sixth hydraulic lines, said one-way check valve allowing fluid communication from said sixth hydraulic line to said fifth hydraulic line and preventing fluid communication from said fifth hydraulic line to said sixth hydraulic line and wherein, when said first hydraulic pump is discharging at no greater than a minimal discharge rate and said third valve is in said first position and said fourth valve in is its open position, hydraulic fluid from said source through said third valve and said seventh line provides pressure within said motor cavity and moves said at least one piston into said retracted position; and wherein said at least one piston is moveable into said extended position by moving said third valve into said second position and providing fluid communication from said motor cavity, though said seventh line and the third valve to said storage vessel and positioning each of said first and second valves in said open position and positioning the fourth valve in its closed position whereby hydraulic fluid from said source is provided from said sixth line through said check valve, said fifth line, said first and second valves to said motor piston bore; and, wherein said motor is actuable after extending said at least one piston by moving each of said first and second valves into said closed position and operating said first hydraulic pump at an elevated discharge rate.

19. The hydraulic wheel drive system of claim 17 wherein each of said first, second, third and fourth valves are solenoid activated valves.

20. The hydraulic wheel drive system of claim 15 wherein said constant source of low pressure hydraulic fluid is a second hydraulic pump having a substantially constant discharge rate.

* * * * *